United States Patent [19]

Jeppsson

[11] Patent Number: 4,875,343
[45] Date of Patent: Oct. 24, 1989

[54] CLIMATE CHAMBER WITH CONVEYOR

[76] Inventor: E. Hakan O. Jeppsson, 942 Albern Dr., Wooster, Ohio 44691

[21] Appl. No.: 168,135

[22] Filed: Mar. 14, 1988

[51] Int. Cl.$^4$ ............................................. F25D 25/02
[52] U.S. Cl. ........................................ 62/381; 198/778
[58] Field of Search ............................ 62/381; 198/778

[56]  References Cited

U.S. PATENT DOCUMENTS

| | | | |
|---|---|---|---|
| 3,348,659 | 4/1967 | Roinestad | 198/136 |
| 3,391,548 | 7/1968 | Gram | 62/381 |
| 3,412,476 | 11/1968 | Astrom | 34/147 |
| 3,794,156 | 2/1974 | Brackmann et al. | 198/136 |
| 3,938,651 | 2/1976 | Alfred et al. | 198/136 |
| 4,103,768 | 8/1978 | Persson | 198/778 |
| 4,565,282 | 1/1986 | Olsson et al. | 198/778 |
| 4,679,687 | 7/1987 | Rehm | 198/778 |

Primary Examiner—Ronald C. Capossela
Attorney, Agent, or Firm—Pearne, Gordon, McCoy & Granger

[57]  ABSTRACT

Disclosed is a climate chamber, such as a refrigeration chamber, with a conveyor apparatus. The conveyor apparatus includes an endless, partially collapsible conveyor belt having a product-supporting bed with an upstanding sidewall along one edge of the belt. The belt is coiled in a generally helical configuration to form a plurality of helical tiers stacked one above the other, so that the sidewall portions form a substantially continuous wall-like surface, with the top portion of a wall of an underlying tier contacting an adjacent superior tier so as to form a generally self-supporting edge region of the conveyor belt. The other edge of the conveyor belt is supported by a generally helical guide rail, which maintains adjacent tiers of the helical stack spaced apart from one another. Air flow through the stack can be freely circulated between the spaced other edges of adjacent tiers and/or vertically through the perforated conveyor belt. The rail-supported edge of the helical stack may be located at either the radically inner or radially outer portions thereof. Arrangements are disclosed for driving the conveyor belt. The foregoing abstract is merely a resume of one general application, is not a complete discussion of all principles of operation or applications, and is not to be construed as a limitation on the scope of the claimed subject matter.

17 Claims, 5 Drawing Sheets

CLIMATE CHAMBER WITH CONVEYOR

BACKGROUND OF THE INVENTION

1. Field of the Invention

The present invention pertains to climate chambers, including an endless conveyor belt which is coiled to have multiple tiers in a generally helical stack.

2. Description of the Prior Art

Many mass production manufacturing operations today include conveyors for transporting articles through a climate chamber. Climate chambers in general can operate over a wide range of temperatures and ambient conditions, with examples including large ovens for cooking, sterilizing curing or heating, as well as refrigeration chambers for cooling or freezing, and chambers for humidifying, dehumidifying, drying, and otherwise treating products with a gas or vapor. Climate chambers offer an economy of production in that they allow a continuous mass processing of articles, as opposed to batch processing, within a relatively confined space. A need has arisen, however, to develop improved reliable conveyor systems for transporting a continuous succession of articles through the climate chambers. In the food processing industry, fresh vegetables, cooked vegetables, raw ground meat, cooked fish, loose French fries, and other food products are received or are preliminarily prepared at a wide variety of temperatures before being introduced for mass processing in large climate chambers. Some products have loose components, such as unfrozen pizza toppings, which are susceptible to being blown off by air currents within a climate chamber, or they may become airborne and lifted when carried on perforated conveyor belts. Other food products, such as unfrozen soft meat patties, may be disturbed if placed on a conveyor belt prior to the belt being collapsed on one side for coiling in a helical stack. Access from the exterior of the belt stack is needed to load meat patties on an already coiled portion of the conveyor belt. A commercially successful conveyor belt design must meet these and other needs that arise in the food processing industry as well as other industries.

Two different types of conveyor systems are used today in the food processing industry. Both conveyor systems have endless belts which are flexible in horizontal as well as vertical directions, allowing them to follow paths which include helical turns or tiers through the climate chamber as well as looping turns of various sizes which align the belts with loading and unloading equipment at the entrance and exit portions of the climate chamber, and with equipment for driving and, on occasion, cleaning the belt. One notable difference between the two types of systems is observed in the support of the helical turns or tiers of the conveyor belt.

An example of one conveyor system is given in U.S. Pat. No. 3,348,659, in which various spiral or helical tiers of a collapsible conveyor belt are separated from one another, sliding on two parallel paths of helical rails located adjacent each lateral edge of the belt. The rails, in turn, are carried by rigid supports extending laterally across the width of the conveyor belt, located underneath to support the weight thereof. The rigid supports in combination with the rails, form a ladder-like helical path underlying the helical turns or tiers of the conveyor belt. This conveyor system can be driven from a central rotating drum having a vertical axis which contacts the inboard edges of the belt, providing the frictional or mechanical engagement necessary to advance the belt along its defined path. The rail-mounted conveyor belt with stationary supporting structures extending between belt tiers has reduced head space clearance for products carried on the product-bearing horizontal surface or weblike bed of the conveyor belt. Considerable space between tiers is taken up by the rails and framework supporting the rails. It has also been observed that products unevenly loaded on the belt, for example, one product partially overlying an adjacent product, may contact the stationary support structure as they are moved by the belt. As a result, products may become jammed within the conveyor belt system, requiring a system shutdown so that the jammed products may be removed from the conveyor belt and the belt and the support structure sufficiently cleaned so as to at least allow parts of the belt to move properly and permit adequate conveyor operation. Frequently, the jamming of products on a conveyor belt requires a thorough manual cleaning of the climate chamber, as well as major portions of the conveyor belt, particularly if the products, such as unfrozen meat patties, are soft enough as to become embedded in the crevices of the conveyor belt or in the perforated bed on which the products are placed. In any event, contact between food products and the stationary supports requires increased servicing of the conveyor belt, to maintain hygienic conditions beyond regularly scheduled maintenance which would otherwise be required.

The first type of conveyor system is inefficient in utilization of vertical height, with only about fifty percent utilization in order to provide space so that the product to be treated will not strike the lateral support arms. Also, this inefficiency in vertical height means a considerably larger volume of the climate chamber which must be cooled to operating temperature, in freezer applications, for a given amount of product to be treated. Further, the dirtying of the support arms by piled-up product, and especially the jamming of the entire conveyor belt by piled-up product, not only stops the freezer for clearing the jam and manual cleaning but also stops the entire processing line of cooking, packaging, etc. within the entire food processing plant. This down time is quite expensive in loss of product output.

An example of the second type of conveyor system is given in U.S. Pat. No. 3,938,651, which has a collapsible conveyor belt that is to some extent self-supporting, having upstanding inboard and outboard sidewalls at the lateral edges of a weblike product-supporting bed portion of the belt. The belt is, accordingly, generally U-shaped in cross section. When configured along a helical path, the belt is Wound into helical turns or tiers, stacked one directly on top of the other. The sidewall plates of the belt are, at the various tiers, vertically aligned on their upper and lower edges such that one sidewall plate is stacked above the other, with plates at both the inboard and outboard edges of the helically wound belt forming a pair of nested cylinders. This second type of conveyor system is normally driven from its lower most tier, which supports the weight of the stack.

This type of conveyor system has three main disadvantages:

(1) the complexity of the stack;
(2) the vertical side links on each side of the stack;
(3) the substantially vertical air flow.

As to the first disadvantage, the stack is supported only from the bottom, and hence it is unstable, since it is not well supported laterally. This can cause the entire stack to collapse, which has been known to happen, with severe belt damage as a result. Also, the stack is harder to drive in its helical movement and in practical applications requires two drive chains, one on the inside and one on the outside of the stack, or else requires a wagon train drive belt underneath and supporting the entire stack. Either of these two drive systems is complex, e.g., U.S. Pat. No. 4,565,282, and the several parts to the entire stack and drive system make a less reliable conveyor because of the many moving parts.

The second main disadvantage is the presence of the two side links, one on each side of the belt, which substantially fully enclose the product. The infeed conveyor in the processing plant must be in line with the conveyor system at the infeed in the climate chamber rather than being at an angle thereto which limits the flexibility of positioning. Also, such incoming conveyor must be narrow enough to fit between the side plates of the conveyor system in the climate chamber to again limit the applications in many processing plants. A similar problem is encountered in the outfeed conveyor from the climate chamber: it again must be in line and must be narrow enough to fit between the side plates of the conveyor in the climate chamber. Still further, the side plates on both inside and outside of the conveyor stack means that it is most difficult to inspect the product during processing in the climate chamber and to determine if any problems are arising. Still further, it is hard to treat the product cryogenically with liquid nitrogen or liquid $CO_2$ because it cannot be sprayed directly on the product for quick freezing because of the presence of the side plates. The presence of the side plates means that the entire belt system is harder to clean, with more moving parts which need to be cleaned. The belt must collapse to permit bending edgewise into a helical path, and if it collapses on the inside of the belt, the side links of the belt can freeze together during travel through a freezer-type climate chamber and then it cannot straighten out properly for the exit from the stack to the exit opening. The presence of the two side links means that the freezer has more mass in the belt with more energy less because the belt travels in and out of the climate chamber at the infeed and the exit, as shown in U.S. Pat. No. 3,938,651, or has a long travel outside the climate chamber, as shown in U.S. Pat. No. 3,412,476, for unloading a product, washing the belt, drying the belt, take-up and infeed of more product. This means the belt is warmed up to room temperature and must again be cooled after entering the freezer chamber, with the extra mass in the belt causing a considerable energy loss. The presence of the two side links means that the structure is poor for a ground meat patty feeder. Such feed cannot be directed radially into the side of the stack because of the side plate and, instead, must be aligned with and on top of the infeed section of the conveyor and be long and thin in order to reach in to place the patties on the already helically formed belt. This long, thin patty loader thus becomes unreliable due to the thin and weak construction.

The third main disadvantage of the second type of conveyor system is the substantially vertical air flow. While all three of the aforementioned prior art patents do show some lateral as well as axial air flow through the stack air flow, the commercially practical conveyor systems have been found to be constrained to substantially vertical air flow. This is because, whereas holes may be shown in the side plates in U.S. Pat. No. 3,938,651, these holes as a practical matter are considerably restricted in size because the side links must be quite sturdy. Each side link must take its turn at the bottom of the stack and must carry the weight of the entire stack and products thereon. As a result, the links must be quite strong and this limits the size of the openings for substantially vertical air flow. This vertical air flow creates a pressure differential between the top and bottom of the stack. This may be only two and a half inches of water differential pressure, which sounds small, but if this is a negative pressure at the bottom of the stack where the infeed occurs, then this creates a high velocity air being drawn into the climate chamber at the opening for the infeed of the conveyor. This high velocity air has been found to be so troublesome that a long baffled tunnel has been used at the entrance in order to attempt to limit the air flow. The high velocity air can cause loose or light products, such as pizza topping, to be blown off the product, or pancakes to be bent double. This results in degraded product quality and product pileup and jamming of the entrance tunnel, so that the entire line must be stopped for cleaning out the entrance tunnel. Other products, such as soft ground raw meat patties, can become damaged, especially in shape, by such high velocity air and pile up in the entrance tunnel. Thus, this requires frequent cleaning of the system and frequent stopping to clear any jams. Further, this pressure differential increases the energy consumption. Energy is also lost by air being bypassed through the tunnel.

The axial air flow encounters resistance of the perforated product-carrying bed portion of the conveyor belt, as well as any products carried on the belt. Thus, in order to ensure a more optimal air flow, it has been found necessary to increase the spacing between products carried on the conveyor belt bed, with the greatest spacing required for larger, sheetlike items of imperforate constitution, such as pies, pizzas, and the like. Even with an increased spacing between products, a significantly high pressure drop between entrance and exit portions of the helical stack results which can also be a problem with multiple layers of items such as potatoes sliced for making French fries. This, in turn, establishes a significantly high pressure drop in the system which circulates the atmosphere of the chamber over the product carried on the conveyor belt.

Alternatives to the tunnel-like baffling include internal walls ("mezzanines") intermediate and parallel to the floor and ceiling of the climate chamber. Such baffling contributes significantly to the frequency with which the climate chamber must be cleaned, and reduces access to internal portions of the climate chamber which is necessary to carry out the cleaning operation. The cost, complexity, and general maintenance of a climate chamber, and at times the size of the climate chamber, are also increased by such baffling.

SUMMARY OF THE INVENTION

The problem to be solved, therefore is how to achieve an entire climate chamber including a conveyor system therein which overcomes these many disadvantages of the prior art systems.

This problem may be solved by a conveyor system with an endless collapsible belt forming a mainly helix-shaped stack for transporting products, and with one side of the conveyor belt in the helix being supported by a rail and the other side being supported by side links that separate the belt tiers in the stack.

The problem may be further solved by a climate chamber having a helical conveyor belt which is movable around an axis within an enclosure and which is collapsible to permit the belt to bend in an edgewise direction, means for circulating a conditioning gas or vapor inside the enclosure around any product on the helical conveyor, and means to support the first side of the conveyor including a spiral rail, and to support the second side of the conveyor including substantially vertical links extending to and engaging the next adjacent tier in the helix.

The problem may further be solved by a climate chamber having a helical conveyor belt movable around an axis in a stack within an enclosure, means for circulating a conditioning gas or vapor within the enclosure and around any product on the helical conveyor, and a first and second means to support first and second sides of the conveyor, characterized in that the first support means includes a helical rail, and the second support means includes substantially vertical links engaging and separating the tiers of the belt in the stack.

The problem may further be solved by an apparatus for conveying products to be treated in a heat transfer chamber, having an endless conveyor belt including a generally horizontal product-supporting weblike bed with a pair of opposed lateral edges and a substantially vertical sidewall on one edge, and with the conveyor belt being coiled in a generally helical configuration to form a plurality of helical tiers stacked one above the other with the sidewall portion of a lower tier contacting the sidewall portion of an adjacent upper tier to support at least a portion of the weight thereof; and a generally helical guide rail contacting the other lateral edge of the conveyor belt to support at least a portion of the weight thereof and to space said other lateral edges vertically apart from one another a distance substantially equal to the height of the sidewall portions.

Accordingly, a feature of the invention is to utilize a conveyor system therein with one side of the conveyor in a helical stack supported by a rail and the other side supported by side links separating and engaging adjacent tiers in the stack. This creates three main advantages: (1) a simpler stack and drive system; (2) with only one side link the infeed outfeed Inspection, and cryogenic treatment become much more simplified: and (3) more freedom to choose a desired air flow pattern.

The first advantage creates a stack which has fewer parts and, hence, is more reliable by having fewer moving parts. It is also of lighter weight so that a greater amount of product can be carried in a particular stack. Further, the use of one spiral or helical rail adds very greatly to the stability of the stack.

The second main advantage of having only one side link means that one side is open and, therefore, the infeed and outfeed conveyors do not need to be in line with incoming or exiting conveyors in the entire processing plant. Also, the width of such incoming and outgoing conveyors need not be limited to those narrow enough to fit between two side plates. With an open side on the conveyor stack, it is easy to inspect the product during processing, and is also easy to pipe in cryogenic fluid for quick freezing or to pipe in steam for quick cooking. The belt being open on one side makes it easier to clean with fewer parts, and if moisture should be on the belt in a freezer, it is likely to freeze in the coiled condition, with the consequent problem of straightening out for the outfeed when frozen. With no side links on the inside, there can be no overlap of such links to freeze together. The elimination of one side link means elimination to some of the mass of the belt for greater energy conservation due to loss as the belt moves in and out of the climate chamber. The absence of one side link permits use of a generally radial patty loader of short and rugged construction.

The third main advantage is the freedom to obtain any desired air flow either up, down, transversely, circumferentially, or a combination thereof, while still maintaining a rugged strong conveyor and conveyor stack. If one might want to quick-freeze fresh ground meat patties, one might desire an upward vertical air flow. If one wants to freeze food such as pizzas with loose topping material subject to being blown off one can select a horizontal air flow or combined vertical and transverse air flow to eliminate the air pressure differential between the top and bottom of the stack.

The entire construction of a climate chamber with conveyor system according to the invention permits air flow such that this pressure differential is substantially eliminated, which means no degradation of the quality of the product with consequent dirty entrance tunnels no dirty transverse support arms no pile-up of loose product being treated against transverse support arms, and as a result far less likelihood of any jams or requirement for frequent cleaning. The entire system is more energy-efficient, resulting in a lower vertical height with less volume to be cooled and less bypass of air.

Accordingly, it is an object of the present invention to provide an improved climate chamber with a conveyor system, especially climate chambers in which the atmosphere thereof is circulated over product carried on the conveyor belt.

These and other objects of the present invention, which will become apparent from studying the appended description and drawings are provided in an apparatus for conveying products to be treated in a heat transfer chamber.

BRIEF DESCRIPTION OF THE DRAWINGS

In the drawings, wherein like elements are referenced alike.

DETAILED DESCRIPTION OF THE PREFERRED EMBODIMENTS

Figure 1:
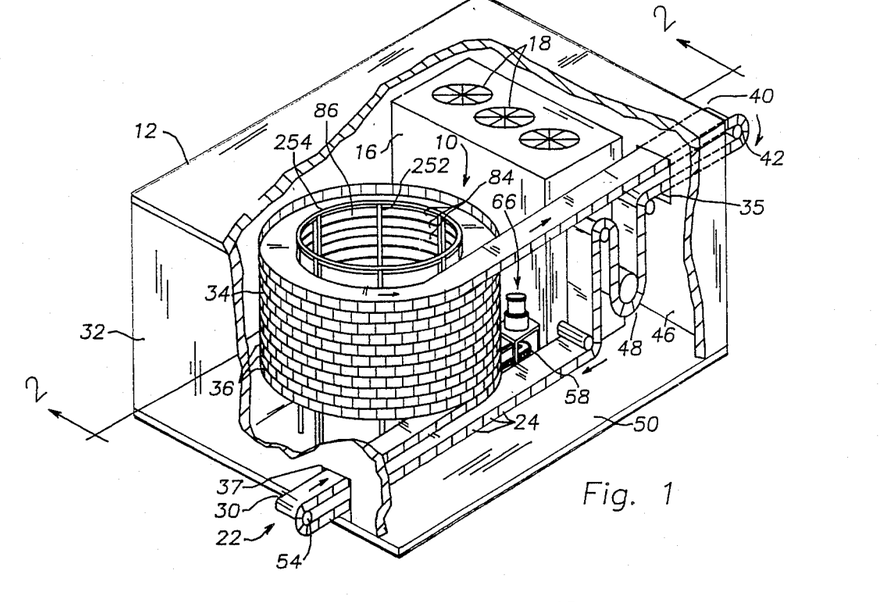
FIG. 1 is a perspective view, partially broken away, showing a refrigeration-type climate chamber with conveying apparatus according to principles of the present invention.
Figure 2:
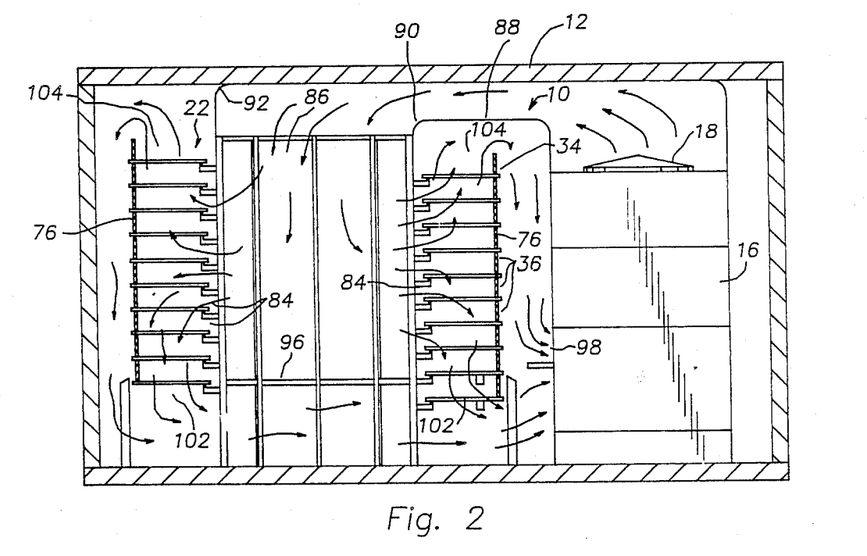
FIG. 2 is a cross-sectional elevational view taken along the line 2—2 of FIG. 1, and looking in the direction of the arrows.
Figure 3:
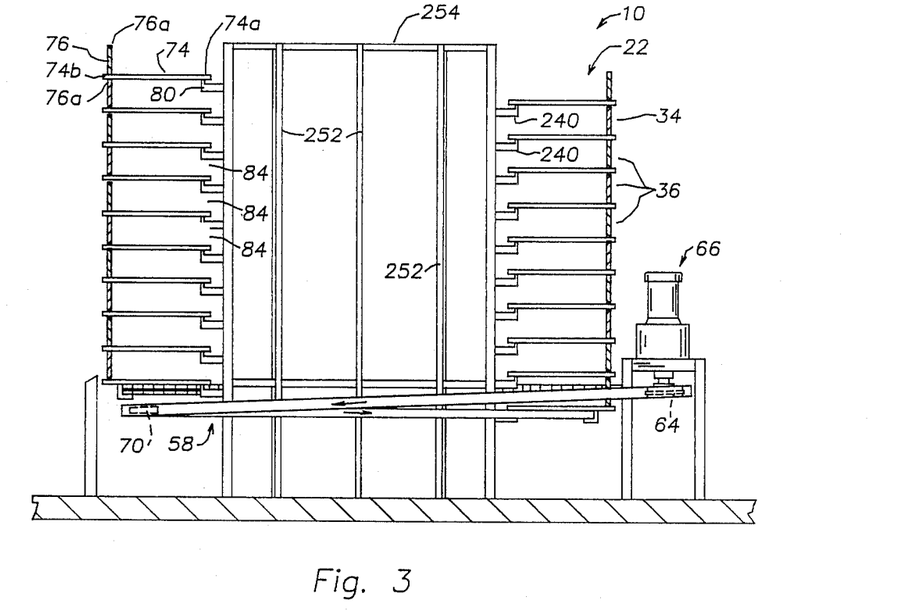
FIG. 3 shows the conveying apparatus portion of FIG. 2 on an enlarged scale.

Referring now to the drawings and especially to FIGS. 1-3, a conveyor apparatus according to principles of the present invention is generally indicated at 10. The conveyor apparatus is shown illustrated in a climate chamber 12 which preferably comprises a refrigerated chamber of the type used for cooling food products and the like. The refrigeration components are disposed within housing 16, and fans 18 are mounted on top of housing 16 to provide circulation of the environment within chamber 12, as indicated by the arrows in FIG. 2. Hereinafter, the atmosphere in chamber 12 will be referred to as "air" for ease of discussion it being understood that the environment can comprise any gaseous or vapor component or mixture of gaseous components. As can be seen in FIG. 2, air enters the lower end of housing 16 through an intake 98, where it is cooled by an evaporator coil and associated refrigeration apparatus, not shown. Air flow is drawn through housing 16 by fans 18 which force a circulation of air within the chamber around, and preferably through, the conveyor apparatus 10 in a manner to be described in greater detail herein.

The conveyor apparatus 10 includes an endless collapsible conveyor belt, generally indicated at 22, which is preferably comprised of a serial succession of articulated belt units 24 which are pivotably interconnected at their leading and trailing ends to form an endless belt which moves upwardly, downwardly, and sideways along the path illustrated in FIG. 1. Belt 22 passes through a loading station 30 outside of climate chamber 12 where products to be treated in the climate chamber are loaded onto the generally horizontal incoming belt section. After passing through an outer wall 32 of chamber 12 the belt 22 enters a lower end of a spiral or generally helical stack 34 whereat the belt is helically wound or coiled to form a plurality of helical turns or tiers 36, each tier comprising a complete 360-degree revolution of the belt 22. In FIG. 1, eleven tiers are shown in stack 34. Owing to the helical configuration of stack 34, the end point of a given tier 36 will lie directly above its beginning point. One advantage of arranging the belt 22 in a helical stack is to provide a relatively long path length for products carried on the belt, through a climate chamber of relatively compact dimensions, an important feature where conditioning of the air within the chamber requires a relatively expensive operation. For example, in the preferred embodiment, the air within chamber 12 is cooled by refrigeration equipment. Accordingly, it is generally desirable to limit the heat transfer into and out of the chamber 12 as much as possible, although some heat transfer accompanies portions where the belt 22 enters and exits the chamber to allow access to the products carried on the belt.

After exiting stack 34, the belt 22 continues in a generally horizontal direction at the upper end of stack 34, approaching an unloading station 40 where the belt leaves chamber 12 through a exit opening 35 in wall 46, exposing the treated product thereon for removal to a subsequent processing or packaging site. In addition to flexing or partially collapsing in its longitudinal direction along its radially inward lateral edge necessary to coil the belt within stack 34, the belt 22 is also preferably constructed so as to be capable of substantial bending in generally vertical, upper and lower directions. For example, after leaving station 40, the belt units 24 are downwardly bent over the guide roller 42 forming, as illustrated, a completely reversed or 180-degree bend. Preferably, treated products have been extracted from belt 22 before the point where the belt leaves roller 42, the product-carrying surface or bed of the belt now being oriented to face in a downward direction. The belt 22 thereafter re-enters the chamber 12 through the wall 46 opening and, after passing through a tension control loop 48, extends across the floor 50 of chamber 12, traveling in a generally horizontal direction. The belt thereafter passes over roller 54, presenting an upwardly facing product-support surface of the belt to the loading station 30 adjacent the entrance 37 to chamber 12. Thus, it can be seen that belt 22 is configured in a continuous, endless configuration and that product can be continuously loaded at station 30 while product is simultaneously unloaded at station 40, with a continuous mass processing of the product being carried out within chamber 12 as the product travels through the multiple tiers of helical stack 34. The belt path illustrated in FIG. 1 is presented herein only by way of example, and other configurations of belt paths are, of course, possible. For example, the entrance and exit portions of the chamber need not be aligned in any manner with one another, or with any particular component located within the chamber. Further, the entrance and exit portions of the conveyor belt need not travel along straight lines as indicated in FIG. 1 but could be curved in horizontal or vertical planes, or both.

Other types of conveyor belt configurations are also possible. For example, a conveyor belt path within a chamber can be arranged to traverse two belt stacks. For example, products entering a chamber could travel upwardly along one stack, exiting the upper portion of that stack, and then enter an adjacent stack also located within the same climate chamber. The conveyor could for example, enter at either the upper or the lower end of the adjacent stack. Additional belt stacks could also be provided within a climate chamber, if desired.

Figure 11:
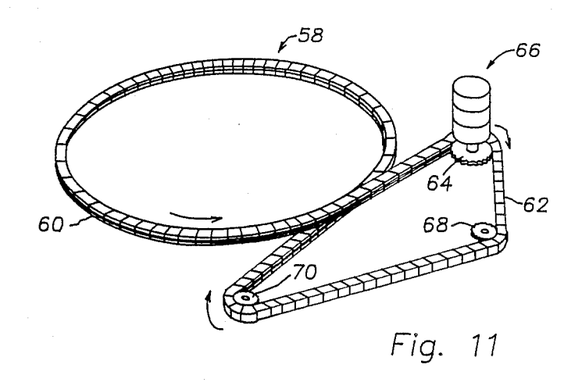
FIG. 11 is a perspective view of a drive chain for the conveyor system of FIGS. 1–3.

Referring to FIGS. 1-3, and additionally to FIG. 11, belt 22 is driven at its lowermost tier by a drive chain generally indicated at 58. As can be seen most clearly in FIG. 11, drive chain 58 includes a helical loop portion 60 and a generally triangular return portion 62. The helical portion 60 preferably engages the lowermost tier of the helical stack 34, as illustrated in FIG. 3. The portion of drive chain 58 leaving the helical portion 60 passes over a sprocket 64 which is powered by a motor, motor control, and gearing system generally indicated at 66, which will hereinafter be referred to as a "motor drive." After leaving the motor-driven sprocket 64, chain 58 passes over guide sprockets 68, 70. Thus it can be seen that an endless, continuous drive chain 58 travels over a path including a helical turn which is preferably aligned with the lowermost helical turn of stack 34. Owing to the rigid, generally incompressible nature of drive chain 58, as well as the chainlike belt 22, the drive chain and conveyor belt have both tension and compression forces applied thereto as the driving power of motor drive 66 is applied through drive chain 58 to the endless belt 22. In general, only a single motor drive 66 has been found to be necessary for adequately driving belt 22 along the tortuous path indicated in FIG. 1; however, other drives might be added as is known in this art, for example, an outfeed section drive which maintains tension on the belt.

Figure 4:
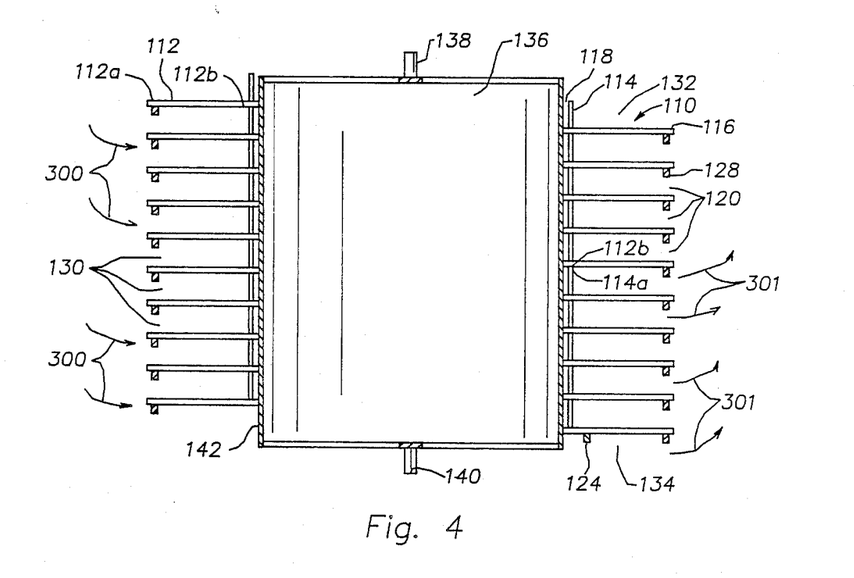
FIG. 4 shows an alternative embodiment of a conveying apparatus according to principles of the present invention.

According to one feature of the present invention, belt 22 and helical stack 34 are constructed so that the stack is generally self-supporting at one of its inboard and outboard edges, and is mounted upon a generally helical guide rail supported by relatively short support arms, lying outside the product zone of the belt, at its other edge. FIGS. 3 and 4 show two alternative embodiments of the conveyor belt and stack supporting systems according to the present invention, each of which has particular advantages, as will be discussed below.

Referring first to the arrangement of FIG. 3, the conveyor belt 22 includes a generally horizontal product-supporting surface or bed 74 having a radially inner or inboard edge 74a and a radially outer or outboard edge 74b. A generally upstanding vertical sidewall 76 is joined to the bed 74 at its outboard edge 74b. The windings of the sidewalls 76 in stack 34 overlie one another so as to form a generally cylindrical outer wall, as illustrated in the perspective view of FIG. 1. Referring to FIG. 3, the top or upper edge 76a of each turn of sidewall 76 contacts and supports the undersurface of an overlying turn of bed 74. Thus, the adjacent tiers 36 are in direct contact with one another at their outboard edges, providing a conveyor belt stack which is self-supporting at its radially outer portion. The outer edges of the tiers 36 are supported at the lowermost tier by framework supporting drive chain 58, in a manner to be described herein.

According to one aspect of the present invention, a second, different type of support is provided for the inboard edge of belt 22, wherein the inboard edge of the belt is supported by a rigid, generally helical guide rail 80. In general terms, the inboard edge of belt 22 slides along the helical guide rail 80, as portions of the conveyor belt advance through the helical stack 34, being raised in height with each rotation through the helical stack. Although specific arrangements for supporting the outboard and inboard edges of the belt 22 will be described below, other methods of support readily apparent to those skilled in the art can also be used. An important feature of the arrangement of stack 34 is that the outboard edge region of the tiers 36 within that stack is self-supporting, owing to the vertical sidewalls 76, while the inboard edge region of the tiers is supported by the turns of a spiral or helical guide rail located outside of the product zone. According to another aspect of the present invention. the turns of the helical guide rail are preferably spaced apart one from the other to form a series of entrances 84 for air flow between adjacent tiers 36. According to another aspect of the present invention, the bed 74 of belt 22 is foraminous preferably having perforations to allow air flow to pass vertically therethrough. Although specific constructions of the sidewall 76 and bed 74 will be given below, those skilled in the art can readily construct a belt having the desired characteristics and yielding desirable advantages, as will now be described with reference to FIG. 2.

Referring now to FIG. 2, the cross-sectional view of the climate chamber 12 and conveyor system 10 is shown, wherein an air flow path indicated by the arrows in FIG. 2 is set up by fan 18, with a minimum amount of internal baffling within chamber 12. After passing through the refrigeration unit within housing 16, the air flow exits the top of the housing, being driven by fan 18. The air flow is directed to an axially-extending central bore 86 of stack 34, being channeled by a generally hornlike upper shroud 88 having an inner wall portion 90 and an outer wall portion 92, which together terminate in a generally cylindrical collarlike portion aligned with central bore 86 of stack 34. Preferably, the lower end of bore 86 is enclosed by generally circular end wall 96, preventing axial flow through bore 86, which would thereby bypass stack 34. Air entering the upper end of inner bore 86 is collected at inlet portion 98 located at the lower end of housing 16. Because of the baffling the air flow within chamber 12 is constrained to pass through stack 34 before being collected at inlet 98.

As will now become apparent to those skilled in the art, a number of desirable air flow patterns can be established within stack 34, depending upon the configuration, especially the presence or absence of foraminous characteristics, of the sidewall 76 and any internal baffling within the internal bore 86 of the stack. For example in the preferred embodiment illustrated in the figures, sidewall 76 is generally imperforate or nonforaminous and, owing to the direct contact between the helical tiers of stack 34, forms an outer, generally imperforate cylindrical wall at the outside of the stack. As generally indicated by the arrows of FIG. 2, air flow entering the stack at the upper end of central bore 86 passes through air flow entrances 84 between the inboard edges of adjacent tiers of belt 22. Consequently, the air flow associated with each entrance 44 initially has a radially outward direction. Thus, the atmosphere within chamber 12 is more completely circulated over the surface of the product contained on the bed 74 of belt 22, thereby providing a greatly improved efficiency in the ability of chamber 12 to condition product carried on the conveyor system. For example, when the climate chamber is used to cool or free product carried on the conveyor belt, the atmosphere or "air" within chamber 12 can, with the present invention, have a significant flow component passing through entrances 84 in a generally radially outward direction, whereas previously atmosphere circulated through helical conveyors was often constrained to enter at only the upper end for flow downward in a generally axial direction. Further, air flows constrained to enter only at the upper end of the helical stack so as to pass axially through the tiers of the stack undergo a significant temperature rise by the time the air flow reaches the lower tiers. It is possible, using principles of the present invention, to now direct cooler air to lower tiers of the stack, thereby improving the performance of the cooling chamber.

It is also possible with conveyor apparatus constructed according to principles of the present invention that the refrigeration (evaporator) coil and/or the fan circulating air through the chamber can be located in the central bore 86 of the conveyor belt helical stack. In particular, the rail-supported conveyor illustrated in FIG. 3, having a chain drive located at the bottom-most tier of the helical stack, can readily accommodate fans or refrigeration coils in a central bore, since the drive drum, as well as any bearings or mountings therefor, are not required as they are in prior art arrangements, such as that of U.S. Pat. No. 4,103,768.

It is generally preferred that sidewall 76 be optimized for strength and rigidity, with little or nc perforation being required. Thus, air in stack 34 then flows vertically through the perforated bed in each tier of the belt before exiting at the lower and upper ends 102, 104 of the stack (see FIG. 2). With this air flow pattern, no significant pressure difference exists between the top and bottom regions of the helical conveyor, which eliminates potential requirements for special infeed or outfeed arrangements in order to minimize the creation of potential high air velocities along the infeed or outfeed regions of the helical conveyor path that could potentially damage products carried on the conveyor. It will now become apparent to those skilled in the art that different baffling arrangements can be provided at the interior bore of stack 34 and/or in the region surrounding the stack so as to produce different air flows therethrough. With additional baffling (not shown) substantially all of the air flow through stack 34 could be returned through its lower end 102. However, with the present invention, it is also possible to collect all or a portion of the air flow through stack 34 at the upper end 104 thereof, and such is generally preferred to reduce the pressure drop through the stack. Thus, for the arrangement shown in FIG. 2, it is possible with the present invention to reduce the path length of air circulated through the stack by a factor of two or more. The pressure drop in the stack is accordingly reduced. This represents a significant improvement in conveyor systems because the amount of product loaded on the conveyor belt can now be increased, pressure differences where the conveyor belt enters or exits the climate chamber can now be dramatically reduced, and the conveyor belt, one side of which is supported by guide rails is considerably more stable, being better able to resist forces tending to dislodge one tier of the conveyor belt from another. Further, the conveyor system as illustrated achieves these advantages without requiring extension of the structure in an axial direction, as was required with certain prior art conveyor systems, to increase the spacing between adjacent tiers thereof. Another significant advantage provided by the present invention is that central portions of the belt are self-supporting and free of framework or rigid support structures transversely through the stack. In particular, the framework supporting the guide rails according to one aspect of the present invention is located adjacent only an edge portion of the conveyor bed, and thus lies outside of the zone of the bed on which products are loaded. These features offer significant commercial advantages in that head space for products carried on the belt is maximized, and the risk of jamming is eliminated.

An alternative embodiment of the conveyor apparatus is illustrated in FIG. 4. As with the belt 22 of FIGS. 1-3, the conveyor belt 110 of the alternative embodiment is generally self-supporting at one lateral edge thereof, and has a generally helical guide rail for supporting the opposite lateral edge. In belt 110, the rail-supported and self-supported edges of the belt 22 have been reversed in their relative orientation. The conveyor belt 110 has a generally horizontal product-supporting surface or bed 112 with a radially outboard edge 112a and a radially inboard edge 112b. A generally upstanding vertical sidewall 114 is joined to bed 112 at its inboard edge 112b. As with the first embodiment of FIGS. 1-3, belt 110 is preferably arranged in a spiral or generally helical stack 116. The turns of sidewall 114 in the various belt tiers are aligned one on top of the other so as to form a generally cylindrical wall adjacent the central bore 118 of the stack. Referring to the mid-portion of FIG. 4, the upper edge 114a of one turn of sidewall 114 contacts the inboard edge 112b of an overlying turn of bed 112. Thus, the adjacent tiers 120 of helical stack 116 are in direct contact with one another at their inboard edges, to provide a conveyor belt stack which is self-supporting at its radially inner portion.

The inner edges of the tiers 120 are supported from below by a support rail 124, preferably of suitable low friction material which slidingly engages the bottom of stack 116 adjacent its radially inner edge. The support rail 124 can take any one of a number of different configurations or could consist of a moving chain. For example, a spaced-apart plurality of relatively short rail portions can be spaced about the lowermost tier of stack 116, or rail 124 can be formed as a single continuous helical turn. Other arrangements for supporting the bottom of stack 116 can also be employed. For example, rollers or ball bearing supports can be disposed to contact the lowermost tier of stack 116. In any event, the stack 116 is generally self-supporting at its radially inner end, with an underlying sidewall portion supporting the weight of the belt tiers disposed thereabove. As with the conveyor of FIG. 1, it is generally preferred that stack 116 rotate as a single unit, avoiding relative rotation between adjacent tiers of the stack, thereby assuring a stable support of the stack, particularly at its inner edge.

Figure 16:
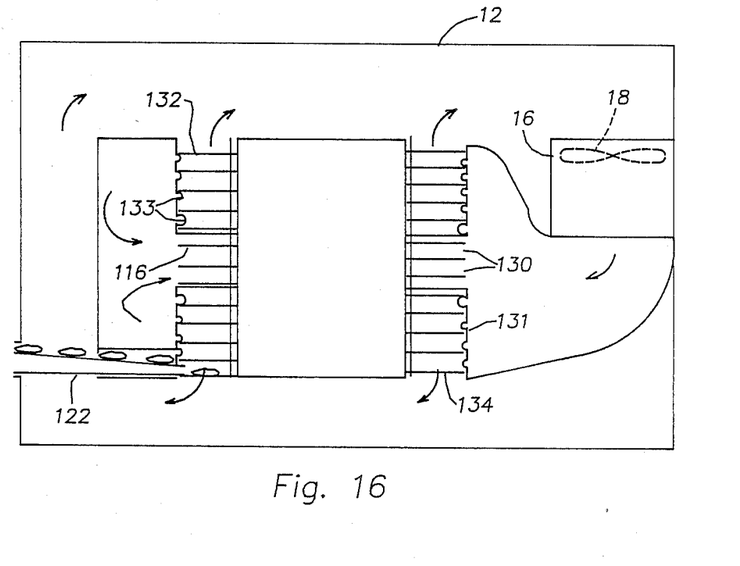

According to one aspect of the present invention, the outboard edge of belt 110 is supported in a manner different from the inner edge. Preferably, a rigid, generally helical guide rail 128, which is in turn supported by short brackets (not shown) carried by posts or the like, provides sliding support for the tiers 120, with the outboard edge of belt 110 sliding along the helical guide rail 128 as portions of the conveyor belt advance through the helical stack 116 being raised in height with each rotation. As with the first embodiment of FIGS. 1-3, the arrangement of belt 110 offers significant improvements in providing a variety of air flows through the helical stack 116. For example, with the proper baffling as shown in FIG. 16, air flow can enter stack 116 through entrance portions 130 formed by a shroud 131 between the radially outer edges of tiers. Thereafter, as was described in FIG. 2, the air flow can be collected at the upper and lower axial ends 132, 134 of stack 116, respectively, with improved circulation of air across the product carried on bed 112, with reduced path length through the stack and lowered pressure drops. The shroud 131 may be provided with graduated apertures 133, larger near the center and smaller near the ends of the stack, to help direct the air flow.

Conveyor belt 110 is driven by a drum 136 disposed within the central bore 118 of stack 116; however, it might also be driven by a chain, as shown in FIG. 11, which engages to the inner edge of the lowest tier of the helical stack. Drum 136 is preferably mounted for rotation at its upper and lower ends by stub shafts 138, 140. Drum 136 has an outer surface 142 which contacts the radially inner end 112b of bed 112. Contact with drum 136 and bed 112 can be made in a variety of ways, so as to impart angular rotation to belt 110. For example, the outer surface 142 of drum 136 can frictionally engage the inboard edges of the various turns of bed 112, or outer surface 142 can be provided with outwardly extending toothlike projections engaging teeth provided at the inboard edge of belt 110. It desired, drum 136 and sidewall 114 can have perforate constructions to allow radial flow at the inboard portion of belt 110. The fan and baffling arrangement can be added to the stack 116 to provide either positive or negative pressure within drum 136 and, if desired, different baffling arrangements can be provided at the radially outer portion of stack 116, providing further variation in the air flow patterns through the stack.

In addition to improved air flow, the arrangement illustrated in FIG. 4 provides other advantages, as will be appreciated by those skilled in the art. For example, it is sometimes desired in refrigeration types of climate chambers to cool or freeze meat patties placed directly on the bed 112 of conveyor belt 110. As portions of the conveyor belt enter the helical stack, there may be a collapsing of the belt or relative movement between the radially inner and radially outer portions of the bed, depending on the particular construction of the conveyor belt. The lower surfaces of the meat patties have been known to become compressed, distorted into a curved shape, or otherwise disrupted at the point where the bed undergoes relative movement between its lateral sides. It is feasible to load such products onto a partially collapsible belt of this type, at a point where the conveyor belt has already entered the helical stack 116. Because there is access to the belt at the radially outer edge, a "patty loader" 122, such as shown in FIG. 16 of short length and desired structural strength can be inserted to load product onto the tier in the lower end of helical stack 116. As the patties are carried by belt 110 throughout the helical stack, they may be cooled or frozen sufficiently that their bottom surface can withstand the changing, configuration of bed 112 at a point where belt 110 "uncoils" or leaves the helical stack 116.

Figure 5:
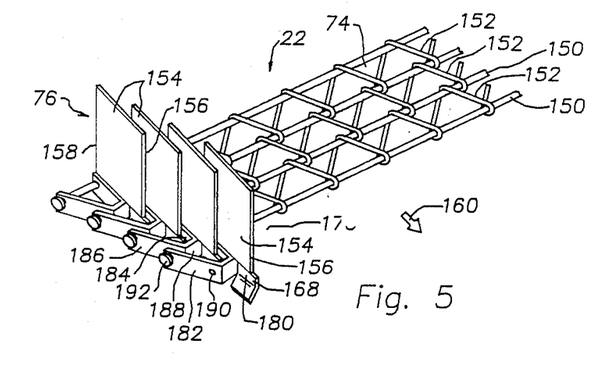
FIG. 5 is a fragmentary, perspective view of FIG. 3, showing the outer portion of the conveyor belt thereof in greater detail.

Referring now to FIGS. 5-8, the construction of belt 22 will now be described in greater detail. Referring first to FIG. 5, a fragmentary portion of conveyor belt 22, taken at the outboard edge thereof, is illustrated. The product-supporting bed portion 74 of the conveyor belt has a generally foraminous construction, consisting of a plurality of transversely extending rods or bars 150. A wire lacing 152 is wound about adjacent pairs of rods 150 in a generally helical pattern with a close pitch spacing necessary to prevent product from falling between rods 150. The spacing of rods 150 and the pitch of their lacing 152 can be varied as desired to suit the particular products carried by the conveyor apparatus, with lacing between adjacent pairs of rods 150, the rods are, in effect, interconnected one with another to provide a substantially continuous, generally horizontal product-supporting surface so as to be flexible in transverse directions, as well as vertical directions, so as to accommodate the tortuous path of FIG. 1, for example, as well as other paths that may be necessary.

Figure 6:
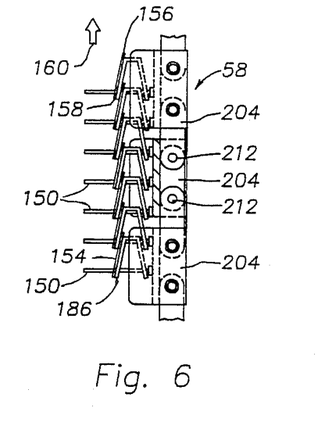
FIG. 6 is a top plan view of FIG. 5 shown in conjunction with a drive chain.
Figure 7:
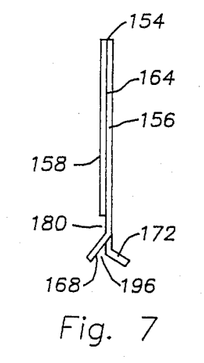
FIGS. 7 and 8 are edge and side elevational views of a sidewall plate of FIG. 5.
Figure 8:
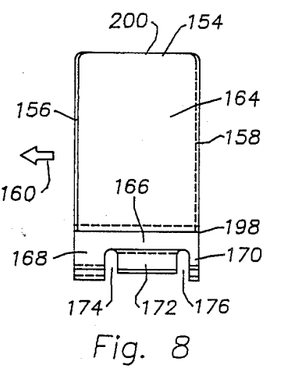

Sidewall 76 preferably comprises a series of partially overlapping link plates 154. Plates 154 have leading and trailing edges 156, 158, respectively. In FIGS. 5, 6, and 8, the arrow 160 indicates the direction of belt travel. As can be seen in the plan view of FIG. 6, plates 154 have their centers disposed along a common line parallel to the direction 160 of belt travel, but are arranged to lie in parallel, outwardly angled vertical planes such that the leading ends 156 thereof are slightly outwardly disposed relative to their trailing ends 158. FIGS. 7 and 8 are drawn with viewpoints taken generally parallel and perpendicular to the direction 160 of belt travel, respectively, with the angular offset of the plates being apparent in those Figures. The plates, however, need not be outwardly angled, but may instead be aligned in the general direction of belt travel. Other arrangements of plates capable of following belt paths curved in horizontal or vertical directions, or both, such as those known in the art, may also be used.

Plates 154 have a generally planar body portion 164 and a lower mounting portion 166 which includes front and rear outwardly extending tab portions 168, 170, separated from an intermediate inwardly-extending tab portion 172 by rod-receiving slots 174, 176. The side view of FIG. 8 is taken from the viewpoint within the conveyor belt looking outwardly so that the inside surface of the plate 154 is visible. The rods 150 extend through slots 174 176, and hence each plate is connected to a pair of adjacent rods 150. The front and rear tabs 168, 170 form concave recesses 180 facing a radially outward direction, as indicated in FIG. 5. A colinearly-aligned series of generally wedge-shaped support members 182 have interior sidewalls 184 interlockingly received in recesses 180. The support members 182 are generally wedge or V-shaped, having the aforementioned interior sidewall 184, an exterior sidewall 186, and an intermediate wall 188 joining the two at the forward, converging ends thereof. Each support member 182 has a pair of apertures 190 formed therein to receive a respective rod 150. Enlarged heads 192 are provided at the outer ends of rods 150 to maintain the support members 182 and plates 154 captive about the rods as the belt undergoes a desired range of movement. Thus, each support member 182 is associated with a pair of adjacent rods 150 and, due to the partially overlapping arrangement of plates 154 is associated with a pair of plates 154. As belt 22 passes over a support such as the guide roller 42 at the upper right-hand corner of FIG. 1, the plates 154, supports 182, and the lacing 152 are pivoted about rods 150. Thus, it can be seen that conveyor belt 22 comprises a series of articulated belt units consisting of support member 182 and overlapping plates 154, the belt units pivotally interconnected at their leading and trailing ends.

Figure 12:
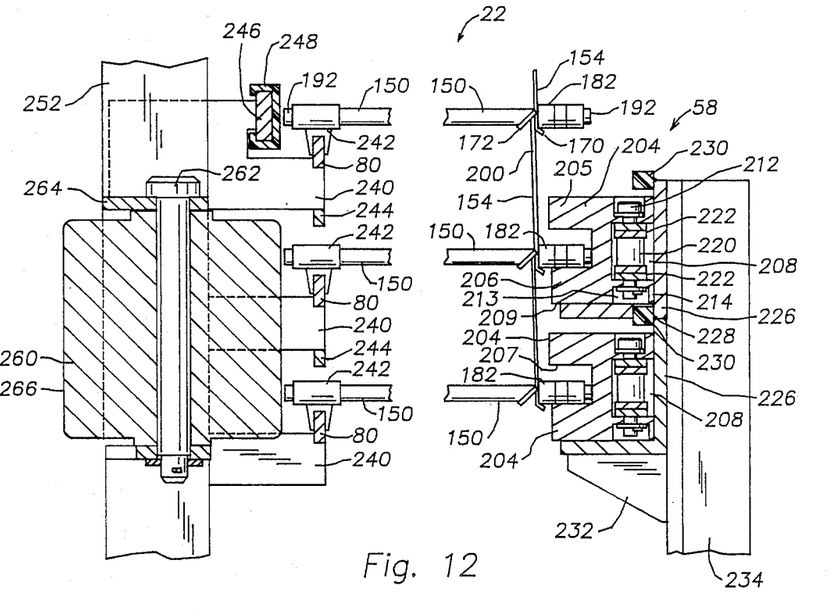
FIG. 12 is a fragmentary view of the lower right-hand portion of FIG. 3 showing a drive system associated with the conveyor belt, in greater detail.

Referring briefly to FIGS. 8 and 12, the central, inwardly-extending tabs 172 of plates 154 provide an internested stacking or interengagement of overlying plate members, with the central tabs 172 forming a crotch or V-shaped recess 196 adjacent the lower end 198 of one plate, to receive the upper end 200 of an underlying plate. This interengagement, along with guide rail support at one end of the conveyor belt, provides significant lateral stability, resisting sideways forces which would otherwise dislocate one helical tier from another.

Referring now to FIGS. 6 and 12, drive chain 58 is illustrated as comprising a series of pivotally interconnected drive links 204 having inwardly extending wall portions or flanges for engaging the upper and lower edges of support members 182, respectively.

Drive links 204 may be formed of metal material, but are preferably formed of a low-friction plastics material, such as ultra high molecular weight (UHMW) types of plastic. Drive links 204 preferably have back-to-back radially inwardly and outwardly facing C-shaped structures. The inwardly facing C-shaped structure has upper and lower walls or flanges 205, 206 separated by an inwardly facing recess 207. Recess 207 receives the wedge-shaped supports 182 of belt 22, confining the upward and downward motion thereof. Preferably, drive chain 58 is configured so that the weight of the belt stack is applied at its bottom-most tier, through the wedge-shaped supports 182 thereof, to the lower flange 206. The outwardly facing portions of drive links 204 define C-shaped structures, where extensions of the upper and lower flanges 205, 206 are separated by an outwardly facing recess 208. Intermediate portions of flanges 205, 206 have pin-receiving passageways therein for mounting pin 212. Pin 212 has an enlarged head at its upper end, received in a recess, and has a lower end with a cotter pin or the like fastener received in a separate recess 213. The recesses are preferably inset from the link lateral edges. A roller sleeve 220 bounded on either end by sets of washers 222, is mounted for rotation about pin 212. As illustrated in FIG. 12, drive link 204 is partially enclosed by an L-shaped channel or track 226. However, portions of drive chain 58 extending past the track are exposed, allowing access to sleeve 220 for engagement with drive sprocket 64, as well as idler sprockets 68, 70 (see FIG. 11).

As mentioned above, the weight of stack 34, or at least the outer end thereof, is transmitted through wedge-shaped supports 182 to the lower flange 206 of drive link 204. The L-shaped track 226 in turn supports drive link 204 in a weight-bearing, and also a sliding, relationship. Accordingly, it is generally desired to have the lower surface 209 of drive link 204 as large as possible, with relatively massive camming surfaces at its latter ends. Accordingly, the recess 213 is inset from the outboard edge of the drive link to form an outer wall portion 214 at the outermost extent of drive link 204.

Figure 13:
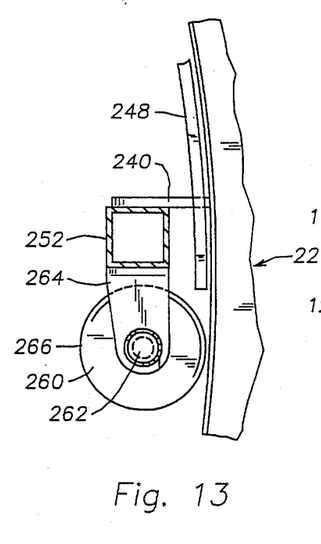
FIG. 13 is a fragmentary plan view of the inner, belt-guiding arrangement shown in FIG. 12.

Referring now to FIGS. 11, 12, and 13, the support chain 58 is shown in greater detail, wherein FIG. 12 shows a portion of drive chain 58 at the end points of its helical portion 60, and accordingly upper and lower tiers of the drive chain are visible in FIG. 12. In the preferred construction, two discrete L-shaped tracks 226 are welded together at 228 and receive additional support thereat by a block 230. Blocks 230 are preferably made of low-friction material and provide further confinement of drive links 204, resisting upward displacement thereof. A series of inwardly-extending walls 232 at the lowermost end of the bottom track 226 supports the weight of stack 34. Wall 232 and tracks 226 are preferably mounted to an upright support column 234. The vertically extending legs of tracks 226 may be omitted, but are preferably included to provide a sliding surface restraining the lower end of the stack against any outward forces which would otherwise tend to distort the desired configuration of the stack.

Referring now to the left-hand portion of FIG. 12 and to FIG. 13, the generally helical guide rail 80 is shown supported at the upper ends of outwardly-extending cantilever arms 240. The inboard edge of conveyor belt 22 is schematically illustrated in the cross-sectional top plan view of FIG. 13. Sleeves 242 are pinned to each inner end of rods 150 and are held captive thereon by an enlarged head 192. As illustrated, helical guide rail 80 is generally elongated in a vertical direction. The sleeves 242 slide on low friction material 243 on top of the guide rail 80. Stable support is provided for the conveyor belt against a number of differently directed dislocating forces. For example, the downward force exerted by the weight of conveyor belt and product loaded thereon is supported by the cantilever arm 240. Radially inward forces are taken by head 192 against rail 246 or by roller 260, described below. Downwardly extending guide blocks 244 of low friction material restrain the inboard edges of belt 22 against upward displacement, contacting the upper surfaces of sleeves 242.

Additional support against radially outward forces at the lowermost tiers of the helical stack has been described with reference to the right-hand portion of FIG. 12. Two different arrangements are illustrated herein for supporting radially inward distorting forces. Referring to the upper left-hand portion of FIG. 12, in a first arrangement, an outwardly facing guide rail 246 is mounted to the upper portion of arm 240. Guide rail 246 generally opposes rods 150, and has an outer low-friction covering 248 for engagement with the enlarged heads 192 of rod 150, restraining any radially inward dislocation forces that may be experienced by the conveyor belt.

Arms 240 are preferably mounted to a number of upright support columns 252. Referring briefly to FIG. 1, eight support columns are arranged about the central bore 86 of helical stack 34. The bottom of support columns 252 are secured to floor 50 and the upper ends are secured to a structural ring 254 (see FIGS. 1 and 3). As can be seen in FIG. 13, support columns 252 are preferably formed of hollow tubular steel members, although other configurations are also possible. Referring to FIGS. 12 and 13, guide rail 246 and cover 248 are illustrated, having a helical or part-helical configuration. Guide rail 246 and cover 248 could also have a relatively short length extending over only a few degrees of the helical stack, as measured in a plan view.

FIG. 13 shows a second arrangement for supporting the stack against lateral forces including an optional roller support 260 which is pinned at 262 to a support arm 264. The enlarged heads 292 at the radially inner ends of rods 150 engage the outer surface 266 of roller 260, to prevent their radially inward travel. The gap between enlarged heads 192 and the outer surface 266 in FIG. 12 is shown exaggerated, as is the gap between enlarged head 192 and guide covering 248, for purposes of clarity in the illustration.

Figure 9:
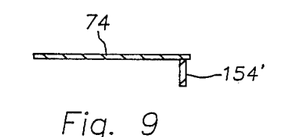
FIGS. 9 and 10 are cross-sectional, schematic views showing alternative embodiments of a conveyor belt.
Figure 10:
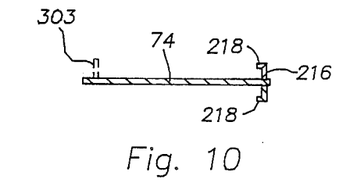

Referring to figures 9 and 10 alternatively constructions of belt 22 are illustrated. As shown in FIG. 5 and other Figures, sidewall 76 is comprised of plates 154 which extend generally upwardly above bed 74. The sidewall of the conveyor belt could also be formed by downwardly extending plates 154' which extend below the product-supporting bed 74. The construction of plates 154 illustrated in FIG. 5 may be used for the arrangement of FIG. 9, without modification. Alternatively, if desired, conveyor belt 22 can be fabricated with link plates 216 joined at their mid-portions to the outer edge of bed 74 so as to extend both above and below the bed. It is generally desirable to provide an interlocking or interengagement between the plates 216 of adjacent helical tiers so that the lower and upper edges of upper and lower plates, respectively are interconnected for increased stability. The inwardly extending shoulder portions 218, as illustrated in FIG. 10, may be employed, or either the upper or lower end can have the V-shaped crotch illustrated in FIG. 7. If desired, the plates 154 described above can be used in the arrangement of FIG. 10, with a pair of elongated slots formed in the mid-section of the plate, elongated in the direction of the plate longitudinal axis, that is in a direction generally perpendicular to bed 74.

Other belt configurations are also contemplated by the present invention. For example, two conveyor belts, one positioned directly above the other, can be wound in a double thread style along adjacent helical paths.

The arrangement illustrated in FIG. 3, for example, can be modified to provide two concentric helical guide rails of equal pitch, one slightly axially offset from the other to provide two helical paths at the inside of the stack, one path for each conveyor belt. The other edges of the conveyor belts can be placed in direct contact with one another, and in direct contact with adjacent tiers, to provide a generally self-supported outer cylindrical wall. Only a single drive would be required for both belts, since the outer edges of both belts are in contact with each other. Such arrangements could provide, for example, a variety of product-handling paths outside of an environmental chamber for products requiring the same processing within the chamber.

Figure 14:
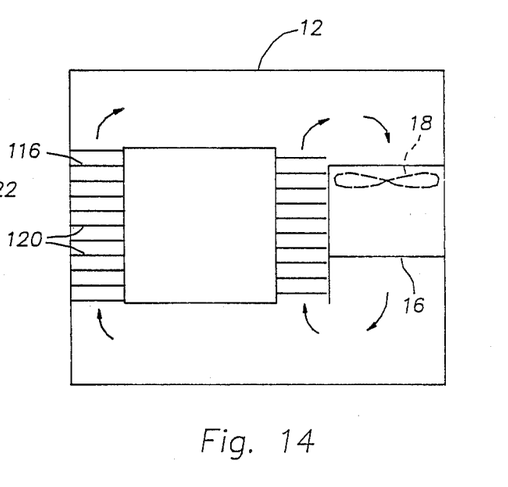
FIGS. 14, 15, and 16 show schematically different air flow patterns possible in the climate chamber.
Figure 15:
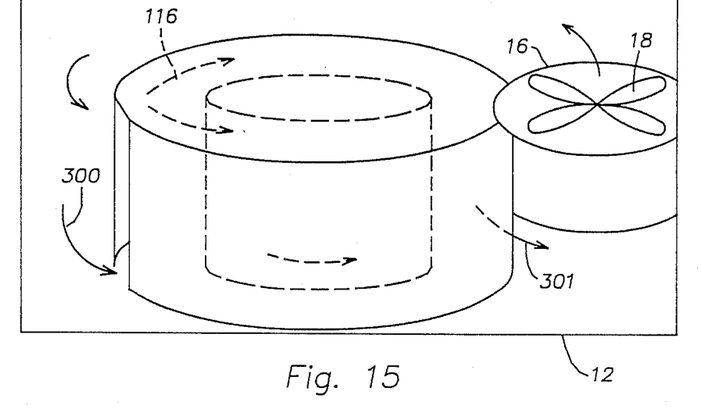

It can thus be seen that a conveyor apparatus has been provided, according to some aspects of the present invention, with an improved construction providing a variety of possible air flow paths through a helical coil or stacked conveyor belt. This freedom to select a particular air flow pattern is a substantial advantage because certain foods can be frozen more efficiently using one particular air flow pattern rather than another. Different types of mountings are provided at the radially inner and outer edges of the helically coiled conveyor belt, with one edge being generally self-supporting and the other edge supported by a generally helical guide rail. The different mountings provide axial compactness for the stack as well as lateral stability. The flexibility of the present design allows the creation of essentially any air flow pattern that may be desired, including a substantially vertical air flow pattern. either up or down, such as shown in FIG. 14 or in U.S. Pat. No. 3,938,651, which pattern might have desirable aspects for the treatment of particular food products assuming the potential high velocity difficulties adjacent the entrance or exit are accommodated. Furthermore it would be possible to create a generally horizontal flow across a conveyor structure having the construction illustrated in FIG. 4, and as shown in FIG. 15, as by baffling the compartment so that all of the air is, for example, directed to the left-hand region where it then flows generally horizontally from left to right through the region of the helical stacked conveyor, as shown by the inlet arrows 300 and the exit arrows 301, generally splitting in half vertically and flowing past and around the central core, reuniting in the right-hand region and then returning, for example, upward as indicated by the arrows 301 to the suction side of the blower.

In one arrangement of the improved conveyor system, a fan system distributes incoming air between the various guide rail supported edges of the conveyor belt, and after being circulated over the products carried on the various turns of the conveyor belt, the air exits from the helical stack at one or both axial ends thereof. Not only is the pressure drop of the air or atmosphere being circulated through the helical stack greatly reduced, but, also, heat transfer with the product is improved in general, e.g., by causing less dehydration of the products in a freezer application, and less baffling is required for the fan system. Thus, it might be preferred for certain operations to locate fan means remotely from the conveyor belt and employ wall means to direct the air flow to enter the conveyor tiers at radial edges thereof and to exit at at least one end tier in the helical stack. Such wall means could direct the outflow from the fan to radially interior regions of the helical stack to create an air flow radially outward past the inner portions of the tiers of the conveyor belt, and passing through the perforate bed of at least one of those tiers. Alternatively, such wall means could direct the outflow from the fan to radially exterior regions of the helical stack to create an air flow radially inward past the radially outer portions of the conveyor belt tiers and passing through the perforate bed of at least one of those tiers. For a helical stack of comparable size, more head space for products is provided with the present invention than with one having stationary framework, which has been eliminated and thus cannot potentially contact the product and cause jamming.

It will thus be seen that the objects hereinbefore set forth may readily and efficiently be attained. It should be understood that certain changes may be made in the illustrated constructions and different embodiments of the invention without departing from the scope thereof, and it is intended that all matter contained in the above description or shown in the accompanying drawings shall be interpreted as illustrative and not in a limiting sense. For example, a still further alternative is illustrated in ghost outline in FIG. 10 wherein partial sidewall panels 303 are added generally along the inner lateral edge of the belt. Both sidewalls could be desirable when handling food products, for example, meatballs, that might have a tendency to move on the belt. The partial sidewalls 303 would preferably be offset just inward from the rail which would generally support the belt along the lateral edge. They might be of any desired height consistent with the air flow pattern desired, e.g., substantially full height panels could be employed to create a substantially vertical air flow pattern through the helical stack.

Particular features of the invention are emphasized in the claims appended hereto.

I claim:

1. A conveyor system consisting of a helical rail and a flat, sunstantially horizontal, endless collapsible belt forming mainly helix-shaped tiers in a stack for transporting products characterized in that one side of the conveyor belt in the helix is continuously supported by said rail and the other side of said belt has as a part thereof substantially vertical side links that support said other side and the tier immediately above and that separate the belt tiers in the stack.

2. A climate chamber comprising, in combination:
an enclosure:
a generally helical conveyor belt in said enclosure movable around said axis;
said conveyor being collapsible to permit the belt to bend in an edgewise direction;
means for circulating a conditioning gas or vapor in said enclosure and around any product on said generally helical conveyor;
first means to support a first side of said conveyor including a generally helical rail; and
second means to support a second side of said conveyor including substantially vertical links extending to and engaging the next adjacent tier in the helix.

3. A climate chamber as set forth in claim 2, wherein said vertical links are side links at said second side.

4. In a climate chamber having a helical conveyor belt movable around an axis in a stack within an enclosure, means for circulating a conditioning gas or vapor within the enclosure and around any product on the helical conveyor, and a first and second means to support first and second sides of the conveyor, characterized in that the first support means includes a helical rail and the second support means includes substantially vertical links engaging and separating the tiers of the belt in the stack.

5. A climate chamber as set forth in claim 4, including in said circulating means a structure to establish substantially equal pressure at the top and bottom of the stack.

6. A climate chamber as set forth in any one of claims 2, 3, 4, or 5, including means for conditioning the atmosphere or the product within said chamber.

7. Apparatus for conveying products to be treated in a heat transfer chamber, comprising:

an endless conveyor belt including a generally horizontal product-supporting weblike bed with a pair of opposed lateral edges and a substantially vertical sidewall on one edge, said conveyor belt being coiled in a generally helical configuration to form a plurality of helical tiers stacked one above the other with the sidewall portion of a lower tier contacting the sidewall portion of an adjacent upper tier to support at least a portion of the weight thereof; and a generally helical guide rail contacting the other lateral edge of said conveyor belt to support at least a portion of the weight thereof and to space said other lateral edges vertically apart from one another a distance substantially equal to the height of said sidewall portions.

8. The apparatus of claim 7, wherein said bed of said conveyor belt is perforated to allow air to flow therethrough so that air flow can circulate radially between adjacent tiers at said other lateral edges and can also flow vertically through said perforated bed.

9. The apparatus of claim 7, wherein said conveyor belt comprises a series of articulated belt units pivotally interconnected at the leading and trailing ends thereof, each having a platelike sidewall extending from on a lateral edge of said bed of said conveyor belt.

10. The apparatus of claim 7, wherein a major portion of said conveyor belt sidewall extends above the bed of said conveyor belt.

11. The apparatus of claim 7, wherein a major portion of said conveyor belt sidewall extends below the bed of said conveyor belt.

12. The apparatus of claim 7, wherein substantial portions of said conveyor belt sidewall extend above and below the bed of said conveyor belt.

13. The apparatus of claim 7, wherein the lateral edges of the bed of said conveyor belt are located at radially inboard and radially outboard portions of the helical tiers of said conveyor belt, with said sidewall located adjacent the radially outboard edge.

14. The apparatus of claim 7, wherein the lateral edges of the bed of said conveyor belt are located at radially inboard and radially outboard portions of the helical tiers of said conveyor belt, with said sidewall located adjacent the radially inboard edge.

15. The apparatus of claim 7, further comprising means for moving said conveyor belt along a preselected path, including rotating drumlike drive means disposed within the stack of helical tiers to contact the inboard edges of the conveyor belt so as to impart an angular velocity thereto.

16. The apparatus of claim 15 wherein said drumlike drive means is perforated so as to form at least one air flow passage therethrough, communicating with the interior of said stack of helical tiers.

17. The apparatus of claim 7, further comprising means for moving said conveyor belt along a preselected path, including a driven chain contacting at least a portion of the lowermost tier in said stack of helical tiers so as to impart an angular velocity thereto.

* * * * *

UNITED STATES PATENT AND TRADEMARK OFFICE
CERTIFICATE OF CORRECTION

PATENT NO. : 4,875,343

DATED : October 24, 1989

INVENTOR(S) : E. Hakan O. Jeppsson

It is certified that error appears in the above-identified patent and that said Letters Patent is hereby corrected as shown below:

Col. 1, line 64, "ladder-like" should be --ladderlike--.

Col. 2, line 54, "Wound" should be --wound--.

Col. 2, line 62, "lower most" should be --lowermost--.

Col. 3, line 45, "less" should be --loss--.

Col. 4, line 43, after "results" insert --,--.

Col. 4, line 61, after "therefore" insert --,--.

Col. 5, line 46, after "infeed" insert --,--.

Col. 5, line 46, after "outfeed" insert --,--.

Col. 5, line 46, "Inspection" should be --inspection--.

Col. 5, line 47, ":" should be --;--.

Col. 6, line 12, after "rugged" insert --,--.

Col. 6, line 25, after "arms" insert --,--.

Col. 6, line 38, after "drawings" insert --,--.

Col. 7, line 22, after "discussion" insert --,--.

Col. 7, line 41, after "12" insert --,--.

Col. 8, line 35, after "1" insert --,--.

Col. 8, line 44, after "could" insert --,--.

Col. 8, line 67, after "thereto" insert --,--.

Col. 10, line 34, ""44" should be --84--.

Col. 10, line 41, "free" should be --freeze--.

Col. 11, line 2, "nc" should be --no--.

Col. 11, line 35, after "rails" insert --,--.

UNITED STATES PATENT AND TRADEMARK OFFICE
CERTIFICATE OF CORRECTION

PATENT NO. : 4,875,343

DATED : October 24, 1989

INVENTOR(S) : E. Hakan O. Jeppsson

It is certified that error appears in the above-identified patent and that said Letters Patent is hereby corrected as shown below:

Col. 12, line 39, after "116" insert --,--.

Col. 13, line 1, "It" should be --If--.

Col. 14, line 15, after "174" insert --,--.

Col. 15, line 12, after "220" insert --,--.

Col. 16, line 40, "alternatively" should be --alternative--.

Col. 16, line 51, after "74" insert --,--.

Col. 16, line 55, after "respectively" insert --,--.

Col. 16, line 63, after "is" insert --,--.

Col. 17, line 31, "." should be --,--.

Col. 17, line 36, after "Furthermore" insert --,--.

Col. 18, line 23, "Both" should be --Such--.

Col. 18, line 35, "I claim:" should be "What is claimed is:--.

Col. 18, line 46, "enclosure:" should be --enclosure;--.

Col. 20, line 1, "on a" should be --one--.

Signed and Sealed this

Thirtieth Day of July, 1991

Attest:

HARRY F. MANBECK, JR.

Attesting Officer

Commissioner of Patents and Trademarks